US006824291B2

(12) United States Patent
Vautrin et al.

(10) Patent No.: US 6,824,291 B2
(45) Date of Patent: Nov. 30, 2004

(54) POCKETBOOK LIGHT (76) Inventors: Michelle Vautrin, 100 Ed Cristine Dr., Apt. 7G, Stroudsburg, PA (US) 18360; Joan M. Monck, 5 Spruce La., Warren, NJ (US) 07059; Paul Monck, 8 Crestwood Dr., Randolph, NJ (US) 07869

( * ) Notice: Subject to any disclaimer, the term of this patent is extended or adjusted under 35 U.S.C. 154(b) by 7 days.

(21) Appl. No.: 10/345,570

(22) Filed: Jan. 17, 2003

(65) Prior Publication Data

US 2004/0141314 A1 Jul. 22, 2004

(51) Int. Cl.[7] ............................................. A45C 15/06
(52) U.S. Cl. ...................... 362/156; 362/551; 362/554; 362/555
(58) Field of Search ................. 362/551, 156, 362/554, 555, 556, 154, 155, 219, 184, 558, 570, 577, 582; 150/106

(56) References Cited

U.S. PATENT DOCUMENTS

| 2,179,214 A | 11/1939 | Hallbauer | 240/6.45 |
| 2,218,396 A | 10/1940 | Hallbauer | 240/6.45 |
| 2,300,108 A | 10/1942 | Curle | 240/6.45 |
| 2,304,387 A | 12/1942 | Whiting et al. | 240/6.45 |
| 2,334,480 A | 11/1943 | Cross | 240/6.4 |
| 2,427,201 A | 9/1947 | Dumbruski | 240/6.45 |
| 2,558,606 A | 6/1951 | Crockett | 240/10.6 |
| 2,647,201 A | 7/1953 | Contento | 240/6.45 |
| 3,408,489 A | 10/1968 | Boyer et al. | 240/6.45 |
| 3,609,341 A | 9/1971 | Castaldo | 240/6.45 |
| 3,800,134 A | 3/1974 | Castaldo | 240/6.45 |
| 3,976,871 A | 8/1976 | Atherton | 240/6.45 |
| 4,332,007 A | 5/1982 | Gibstein et al. | 362/200 |
| 4,517,627 A | 5/1985 | Bradford | 362/156 |
| 4,638,412 A | 1/1987 | Weigert | 362/156 |
| 4,654,763 A | 3/1987 | Knight | 362/156 |
| 4,742,438 A | 5/1988 | King | 362/156 |
| 4,912,611 A | 3/1990 | Lyle | 362/156 |
| 4,954,934 A | 9/1990 | Kidder et al. | 362/156 |
| 4,972,304 A | 11/1990 | Ylla | 362/156 |
| 5,001,462 A | 3/1991 | Seemann et al. | 340/574 |
| 5,018,057 A | 5/1991 | Biggs et al. | 362/295 |
| 5,038,271 A | 8/1991 | LoBello | 352/154 |
| 5,073,844 A | 12/1991 | Coyner et al. | 362/156 |
| 5,268,827 A | 12/1993 | Granneman et al. | 362/156 |
| 5,424,926 A | 6/1995 | Myers | 362/156 |
| 5,444,605 A | 8/1995 | Rivera | 362/156 |
| 5,709,464 A * | 1/1998 | Tseng | 362/276 |
| 5,833,352 A | 11/1998 | Goodwin | 362/156 |
| 5,908,232 A | 6/1999 | Burns et al. | 362/156 |
| 5,934,790 A | 8/1999 | Quintana et al. | 362/191 |
| 6,059,423 A | 5/2000 | Knopick | 362/156 |
| 6,099,140 A | 8/2000 | Norris | 362/156 |
| 6,120,162 A | 9/2000 | Guerrieri | 362/155 |
| 6,152,572 A * | 11/2000 | Cutler | 362/155 |
| 6,340,235 B1 | 1/2002 | Bryan | 362/156 |
| 6,447,142 B1 * | 9/2002 | Weir | 362/156 |
| 6,637,909 B1 * | 10/2003 | Bryan | 362/156 |

* cited by examiner

Primary Examiner—Thomas M. Sember
Assistant Examiner—Bao Q Truong
(74) Attorney, Agent, or Firm—Ernest D. Buff & Associates, LLC; Ernest D. Buff; Dave Nerasimhan

(57) ABSTRACT

An apparatus for illuminating the contents of a pocket book has a battery in electrical contact with a switch, and an illuminating light source comprised of incandescent light or at least one light emitting diode. An optically transmitting light pipe is coupled to the illuminating light source to bring the light closely proximate to the contents of the pocketbook. Light from the transmitting light pipe is extracted at selected locations to illuminate the pocketbook contents. A set of individual light emitting diodes connected to the battery and switch can, optionally, be disposed along the bottom or at least one sidewall of the pocketbook to illuminate its contents. Each of the illuminating systems provides omni-directional illumination in close proximity to the pocketbook contents without subjecting them to injury from hot or broken light bulbs.

29 Claims, 4 Drawing Sheets

POCKETBOOK LIGHT

BACKGROUND OF THE INVENTION

1. Field of the Invention

The present invention relates to illumination of pocketbooks; and more particularly, to a method and means for illuminating a pocketbook interior to enable easy access to its internal contents and facilitate their safe, timely retrieval even in dimly lit or darkened conditions.

2. Description of the Prior Art

Prior art workers have struggled to devise illuminating devices suitable for use in pocketbooks, book bags, luggage and the like. Some of these illuminating devices can be separated to function as a handy light. Others are integrally connected to the associated bag.

U.S. Pat. No. 2,179,214 discloses an illuminating device for pocketbooks or like receptacles. It comprises a light attached to the flap of a pocket book powered by a set of batteries. A slide fastener actuates electrical conductors passing through one of the sides of the pocketbook compartment. The illuminating device is external to the pocketbook compartment. Minimal illumination is provided to the pocketbook contents. The high temperature light bulb tends to damage contents of the pocketbook, and is likely to burn the user's skin if brought into direct contact therewith.

U.S. Pat. No. 2,218,396 discloses an illumination device for pocketbooks. The illuminating light is attached to a flap on a pocketbook and illuminates the contents of the pocketbook from an external location. A rectangular plate holds the illuminating lamp. The plate has an aperture inside the pocketbook through which the lamp is viewable. Illumination is thereby provided whether or not the pocketbook is closed. A rectangular window is additionally provided for external illumination. The lamp is actuated by sliding a closure switch. Its power emanates from a set of batteries positioned at the bottom of the pocketbook and connected to the illuminating light and switch by means of conducting metallic wires. Owing to the external bulb location and the relatively small window aperture, only a small portion of the pocketbook is illuminated. To overcome this inefficient illumination arrangement, the light must be very bright causing operation thereof at a high temperature. Such temperatures increase chances for damage to the pocketbook contents and will likely injure uses upon contact. Battery power is quickly consumed limiting the illumination time.

U.S. Pat. No. 2,300,108 discloses an illuminating mechanism for handbags. The illuminating device is affixed to the one of the frames of a handbag, overnight bag, suitcase or the like. An illuminating means is embedded in a metallic plate securely held by the frame. Passed through an opening in the plate is an illuminating bulb for illuminating the interior of the bag. The bulb is energized by spring contacts, which close an electrical circuit when the frames of the bag are moved apart from one another. Illumination is accomplished from a location external to the bag's interior. As a result, the illumination provided to the pocketbook's interior contents is minimal.

U.S. Pat. No. 2,304,387 discloses an illuminated handbag. A pocket construction is affixed to the inside wall of the bag, which contains two rows of batteries. Also affixed to the inside wall are a bulb and an actuating mechanism, which turns on the light when the bag is opened. The illuminating light is affixed near the bottom of the pocket construction, shining light to the contents of the handbag. Mounting is accomplished by a pocket construction affixed to one of the side walls of the handbag. The illuminating bulb is mounted on the bottom of the pocket construction, and directs the light toward the contents of the handbag when the bulb is activated. Illuminating light is directed in one direction solely, causing objects to shadow each other. As a consequence, complete visibility of the handbag contents is impeded. The high temperature bulb and its location inside a pocket within the handbag's interior tends to melt heat sensitive objects such as lipstick, or ignite flammable articles such as tissue paper. Hand contact with the hot bulb may cause skin damage.

U.S. Pat. No. 2,334,480 discloses a handbag illuminating device. A common flashlight is attached to the bottom of a handbag, brief case or the like. The handbag has an opening in the bottom to attach the flashlight, which is turned on in the usual way. Such a device is not used as an illuminating device to view the contents of a pocketbook. It consumes substantial power, and is large, heavy and expensive. If left in the "on" condition for an appreciable time period, the flashlight develops heat likely to damage the pocketbook contents.

U.S. Pat. No. 2,427,201 discloses a handbag light. Means are disclosed for illuminating the handbag's interior. Two batteries are connected in series. Metallic wires passing through a switch connect the battery to a light bulb held within containment "F". The containment "F" shields the light bulb from direct view; but limits illumination of the handbag contents to those directly below the light. The light illuminates objects directly below it through the containment "F". Objects thus illuminated may shadow each other, preventing full visibility of articles contained by the handbag. The containment prevents the hot light bulb from direct contact with objects in the handbag. However, it tends to prevent the light bulb from illuminating many objects within the interior of the handbag. Construction requirements imposed by the illuminated handbag cause the illuminating bulb to be distant from many of the handbag objects, limiting illumination of objects there within.

U.S. Pat. No. 2,558,606 discloses a purse light. A compact illuminating device in the form of flashlight with two batteries and a centrally located illuminating bulb with a transparent member directs light onto the contents of a purse. The flashlight device is removable; and can be inserted into a receptacle on the inner side wall of a purse. Manual activation of the flashlight is accomplished by movement of a switch on the flashlight body. The bulb carries a reflecting and focusing transparent member that downwardly directs light from the bulb to illuminate the contents of a purse. Inasmuch as bulb illumination is directed downwards solely, objects in the purse can shadow each other, limiting the user's ability to see them. Light available for illumination is limited due to the distance between the flashlight and the purse contents. The focusing element encases the high-temperature flashlight bulb, and prevents direct contact of purse contents with the hot bulb.

U.S. Pat. No. 2,647,201 discloses a lady's lighted handbag. The back wall of a handbag is provided with a channel within which are enclosed a set of batteries, electrical connections and bulbs. A corrugated reflecting mirror directs the illuminating light towards the bottom of the handbag. The illuminating light bulbs are turned "on" by a switch 64. Since the light bulbs are expected to be hot, any contact between the lighted bulbs with heat sensitive contents of the handbag will result in melting or product deterioration. Moreover, physical contact with these bulbs may cause skin damage or ignition of flammable material, such as tissue paper. If the handbag is suddenly inverted, objects in the handbag may impact the illuminating bulbs, causing bulb breakage and production of glass shards. Since bulb illumination is directly downwards solely, objects in the purse can shadow each other preventing full visibility of handbag contents. The large distance between the bulbs and the bag contents results in poor illumination unless the bulbs are run at high intensity levels, which would increase bulb temperatures and likely damage heat sensitive contents of the handbag.

U.S. Pat. No. 3,408,489 discloses an illuminable handbag. An incandescent illuminating light affixed to one of the side walls of a handbag is rotated to point light in any direction within a plane parallel to the side wall surface. The light is encased in a cup shaped shield having one end open, where the light is directed. The other end of the cup shaped shield is closed. The shield is rotatably mounted to direct the light in a plane parallel to the side wall of the handbag. Objects are thereby illuminated in any direction, and illumination of selected portions of the handbag is facilitated. When switched to the "on" condition, a battery provides power to the incandescent, illuminating light bulb. The illuminating light runs hot, and must be prevented from contact with heat sensitive or flammable material. It projects a narrow beam of light, which only illuminates a small portion of the handbag contents. Since illumination is directed downwards solely, objects in the purse can shadow each other preventing full visibility of handbag contents. Owing to the large distance between the incandescent light bulbs and the handbag contents, illumination of objects is limited. If the handbag is suddenly inverted, objects in the handbag may impact the illuminating bulb. In such instances, the bulb would likely break, producing glass shards.

U.S. Pat. No. 3,609,341 discloses an illuminated handbag. A rotatable clasp functions as a switch turning "on" a plurality of lights sequentially. Using appropriate circuits, all lamps can be turned "on" simultaneously. Incandescent lights are mounted in the side walls of various compartments of a handbag. A battery powers the light bulbs through the rotatable clasp switch. Incandescent bulbs tend to burn hot. They can easily damage heat sensitive objects such as lipstick and the like. Heat from incandescent bulbs can ignite tissue paper, and burn the handbag contents or its user. Inasmuch as bulb illumination is directed strictly downwards, objects in the purse can shadow each other, preventing full visibility of handbag contents. The large distance between the bulbs and the handbag contents results in poor illumination. If the handbag is suddenly inverted, objects therewithin may impact these multiple illuminating bulbs, causing breakage and production of glass shards.

U.S. Pat. No. 3,800,134 discloses an illuminated handbag apparatus having a walk-along light. The handbag interior is provided with a detachable freestanding illuminating incandescent light bulb connected by an elongate flexible conductor. A switch connects the incandescent light bulb to a battery power source. The switch may be activated by the closure mechanism of the handbag, whereby the light bulb goes on when the handbag is opened. Alternatively, the light bulb can be independently controlled to illuminate a pathway regardless of whether the handbag is closed or open. The incandescent light may be tilted to illuminate the interior of the handbag or drawn out of the handbag to illuminate the path. This incandescent light bulb invariably runs hot. It is unprotected, and can damage heat sensitive products in the handbag; or ignite tissue paper; or burn the user. The light is situated far above products in the handbag, limiting illumination of handbag contents.

U.S. Pat. No. 3,976,871 to Atherton discloses a handbag with means for illuminating the interior. The handbag has a frame to which a flexible pouch is attached forming the handbag. One leg of the frame carries a curved cavity in which a pair of batteries, a switch and an incandescent light bulb are housed. A transparent window covers the cavity at the light bulb. When the light bulb is switched on it illuminates the contents of the handbag. Inasmuch as a transparent window covers the bulb, the contents of the bag are prevented from contacting the hot incandescent light bulb. The bulb will not break easily if the bag is turned upside down. However, the light source is far away from the handbag contents. As such, it provides limited illumination for contents of the handbag. Articles are likely to shadow each other, preventing full visibility.

U.S. Pat. No. 4,332,007 discloses a miniature utility flashlight comprising two batteries and two lamps. A transparent serrated light distributing surface covers the light bulbs. When the switch is turned on the lamps can be energized sequentially or simultaneously, illuminating objects through the serrated transparent cover. This self-contained miniature utility light can be attached to a garment or pocketbook using a variety of attachment means, including a hook and pile attachment mechanism. Such a device is not technically a pocketbook light. Rather, it is a self-contained miniature flashlight, which can be used for a variety of applications.

U.S. Pat. No. 4,517,627 discloses a spotlight for a handbag and like receptacles. The device comprises a compact flashlight powered by a dry cell and activated by a switch. A conical reflector attached to one side of the flashlight produces the spotlight. The other side of the flashlight can be detachably attached to the side wall of a handbag. This self-contained spotlight can be easily removed from the pocketbook. It can be used for other purposes than illuminating a pocket book. Since it is detachably attached to the side walls of a handbag, the collimated spotlight essentially directs a light beam on the other side wall of the handbag, and does not effectively illuminate the contents of the bag. Detaching the spotlight can illuminate the contents of the handbag; but this requires more than two hands. That is to say there would be required: a first hand to hold the spot light; a second hand to hold the bag; and yet another hand to keep the handbag open and look for articles there-within.

U.S. Pat. No. 4,638,412 discloses an automatic pocketbook illuminator. A photodetector circuit is used to determine the degree of darkness, within the pocketbook, to energize the illuminating bulbs. When the pocketbook is closed, the inside of the pocketbook is dark and the light is prevented from energizing by a pocketbook closure latch, which deactivates the photodetector energizing circuit. The photodetector circuit responds to ambient light within the pocketbook to energize the bulbs. The closure latch deactivates the photodetector circuit to prevent it from energizing the bulbs upon closure of the pocketbook when its interior is dark. In a completely dark room opening the pocketbook does not turn on the light since the photodetector assumes that the pocketbook is closed. For this device to operate, certain at least low-level ambient light is needed.

U.S. Pat. No. 4,654,763 discloses a pocketbook light that is a battery powered incandescent light bulb. A double activating switch activates the light bulb, avoiding accidental activation of the light by contents of the pocketbook. A lens covers the light bulb. The pocketbook light is attached within the compartment of the pocketbook, using hook and loop pile strips. This light illuminates objects directly below the light source. Moreover, the light source is distant from the pocketbook objects. Hence, the light bulb functions at a high temperature, thereby consuming significant battery power and increasing operating costs. A lens covers the light bulb to reduce damage to heat sensitive articles in the pocketbook.

U.S. Pat. No. 4,742,438 discloses a purse light. The self-contained purse light contains two batteries, a switch, two light bulbs and a transparent cover 25. The purse light is detachably attached to the side walls inside the purse using two keyholes to engage the tabs. Each of the two light bulbs is powered by a pair of batteries. A switch is used to turn the lights on and off. Since the lights are distant from the objects in the purse, they must be bright, and therefore consume a significant amount of power. The light beam is nearly vertical, causing objects therebeneath to shadow each other. Visual inspection of the articles within the purse is likely to be difficult. A transparent cover shields the light bulbs to prevent contact with heat sensitive articles within the purse.

U.S. Pat. No. 4,912,611 discloses a purse light. The light has two components: (i) a set of batteries connected to an incandescent light bulb; and (ii) a separate switch, which can activate the light bulb when pressed. The light bulb structure and switch structure are attached to a purse. Attachment of the light bulb structure is effected near the top of the purse using detachable hook and loop fasteners. The light bulb assembly faces downwards, illuminating objects in the purse. Attachment of the switch structure is accomplished using hook and loop fasteners disposed in-between the closing and opening frames of the purse, so that the closed position of the frames opens the switch contact and switches the light off. The detachable light structure can be moved outside the purse to illuminate a keyhole in a door or automobile ignition lock. The detachable light bulb structure can be oriented to illuminate required areas in the purse, or removed to illuminate objects external to the purse. Attachment areas for the light bulb structure within the side-walls of a purse are limited, due to the increased weight of the batteries. Such a device is too bulky for use in illuminating contents of a purse.

U.S. Pat. No. 4,954,934 discloses a purse light which is powered by a single battery and powers a single light bulb placed behind a lens. The bulb can be turned "on" or "off" by a switch. The purse light assembly is removably attached to the top portion of the side wall of a purse using hook and loop pile strips. This light illuminates only objects directly below the light source, which is remote from objects within the purse. The light bulb operates at a high temperature. It consumes significant battery power, driving operating costs higher. A lens covers the light bulb to reduce danger of damage to heat sensitive articles in the pocketbook.

U.S. Pat. No. 4,972,304 discloses a lighting system in a handbag having a liner and outer shell. A flexible-mounting member is attached to the liner between the outer shell and liner. A switch, incandescent light bulb and battery are attached to the flexible-mounting member with the light and switch extending through the liner into the interior of the handbag. The compact illumination device is expected to not interfere with contents of the handbag. When the light is turned on it illuminates in all directions and does not preferentially illuminate the objects in the handbag. It may temporarily blind a user looking for objects in a darkened room, since the incandescent light is not shielded. The exposed light runs hot. It can contact and burn or degrade objects in the handbag. Heat sensitive objects such as lipstick, or flammable products such as tissue, can be damaged beyond repair. Contact with the light bulb may burn the user or pocketbook contents. Inasmuch as the bulb is exposed, it can be broken by objects in the handbag. Turning the bag upside down, or subjecting it to vibration will likely break the incandescent bulb, producing glass shard.

U.S. Pat. No. 5,001,462 discloses a personal safety alarm and light. This safety alarm and light can be worn by the user or removably attached to a handbag or purse. It can emit audio alarms or flashes of light in an emergency situation; or can be used as a steady flashlight. Each of the flashing light and the steady light emits light perpendicular to the flat portion of the device. The flat device is attached to the side-walls of a purse or pocketbook, preventing it from functioning effectively to illuminate the contents thereof. Moreover, the large size of the device tends to impede access to objects in a small pocketbook or purse.

U.S. Pat. No. 5,018,057 discloses a touch initiated light module. A touch sensitive sensor activates a solid state circuit to determine whether the touch sensitive sensor is pressed within 2 seconds. When the touch sensitive sensor is pressed within the prescribed 2 seconds, an incandescent light, powered by a battery, is activated. The solid state circuit shuts the light off after a predetermined period of time. This battery powered light with solid state activation and shut off is small enough to be used in confined spaces. It is not specifically a pocket book light, though in some versions the device may be small enough to be used in confined spaces such as a handbag interior. The light is distant from the objects in the handbag, and does not effectively illuminate them.

U.S. Pat. No. 5,038,271 discloses a transportable lighted pouch. It uses a pouch having a battery, a push button "on"—"off" switch within the pouch, and an incandescent light bulb. The light bulb is external to the pouch, and emits light downwards when the pouch is mounted in a handbag. a pocketbook or a purse using hook and loop attachment strips. Optionally, the pouch may have a usable compartment above the battery compartment. Inasmuch as the light is far away from the contents of the pocketbook, handbag or purse it must utilize high intensity, and consumes significant battery power. Objects shadow each other since the light beam is directed solely downwards. The high temperature light bulb tends to degrade heat sensitive objects in the handbag, pocketbook or purse. It may initiate ignition of flammable material closely proximate thereto. Movement of the handbag contents can break the glass light bulb, producing glass shards.

U.S. Pat. No. 5,073,844 discloses a lighted baggage piece. The luggage piece comprises a shell and a lining. A plurality of incandescent lights encased in a flexible plastic tubular shield are coupled in series and disposed along the interior of the shell along each of a first side wall, a bottom and a second side wall. They are connected to a 9 volt power source and a switch. A string of 'Tivoli' lights encased in a flexible plastic tubular shield prevents the escape of broken glass. The light string can be anchored to a "soft shell" purse using couplings, which receive the plastic tubular shield. Incandescent lights consume a large amount of power. Since the lights are connected in series, the total voltage drop across the string of lights is 9 volts, the voltage of the battery. Each lamp shares voltage nominally equal to 9 volts over the number of lights. At this low voltage, if the lights are to produce any brightness, the lamp resistance must be very low, thus drawing a large amount of current and depleting the battery life quickly. If the lights draw enough current to produce effective brightness, they tend to adversely affect the integrity of the flexible plastic shield. This is especially the case when the shield is buried below the articles in a handbag (where the heat from the lamps cannot be readily dissipated). Breakage of any lamp in the 'Tivoli' string light connected in series results in all the lights shutting off simultaneously, with the result that the entire 'Tivoli' string light must be replaced. This can readily happen when moderately heavy objects are placed inside a handbag. In such cases, the weight of the objects crushes one or two string bulbs inside the plastic shield defeating operability of the string light system.

U.S. Pat. No. 5,268,827 discloses a handbag lit with electroluminescence. Electroluminescent devices are thin and flat. They consist essentially of capacitors which produce light without producing heat, and normally require alternating current power supply. A battery powered through an on/off switch is inverted to AC and applied to run the electroluminescent light in a handbag. Power for the electroluminescent device is obtained from a battery through an inverter, which converts the DC voltage of the battery to an AC voltage. Electroluminescent devices require high voltages, which can be readily obtained by transforming the voltage produced by the inverter. The process of converting DC to AC requires chopping circuits and consumes significant power. High voltages at the electroluminescent device terminals pose electrical shock and short circuit hazards. The electroluminescent devices are thin film capacitors, which are easily destroyed. For example, impact by small coins, or the like, tend to short circuit a capacitive, electroluminescent device.

U.S. Pat. No. 5,424,926 discloses a purse light. The purse light, which is attached to a purse using adhesives or rivets, is applied over a t-shaped channel in the purse. The purse light consists of two batteries, a switch and an incandescent light comprising a longitudinal reflector and a diffusing lens, which projects a beam of light downwards towards the contents of the purse in a multitude of directions. The purse light also contains a digital clock mounted in a face opposing the diffusing lens, which is visible when the purse is opened. The clock is readily visible, since the purse light is anchored to the wall of the purse using adhesives or rivets. Inasmuch as the light is far away from the contents of the purse, the light beam tends to be weak. The light is projected strictly downwards from the top of the purse. Accordingly, objects in the purse may shadow each other, reducing visibility.

U.S. Pat. No. 5,444,605 discloses an illumination device for a purse. A racket detachably hangs the illumination device over the frame of a purse. The illumination device consists of a pair of batteries with an on/off switch connected to an incandescent light bulb that is encased in a reflective lens assembly. The lens assembly consists of a back reflective panel and four lens elements, one on the bottom and three on the sides, to diffuse the light so that the contents of the purse are illuminated. Owing to their large distance from the bulb objects in the purse are dimly illuminated. The diffusers only decrease the intensity of available light. The box construction of the diffusing lenses covering the illuminating light is bulky, and occupies valuable space within the purse.

U.S. Pat. No. 5,833,352 discloses a briefcase flexible light. The flexible light, together with a switch and a set of batteries, is attached to a flexible arm, which is attached to a sliding plate that is attached to a base plate. The base plate is permanently attached to one side of the hinge on the inside of the briefcase. With this arrangement, the light assembly can be extended outward from the top face of the inside of the briefcase. It can additionally be moved up or down; or its angle adjusted to illuminate a particular selected portion of the briefcase. Further, its angle can be changed to illuminate selected objects within the briefcase. The light is extendable, and its angle and height are adjustable to view selected portions of a briefcase. Owing to its bulkiness, the device is not well suited for use as a pocketbook light.

U.S. Pat. No. 5,908,232 discloses an illuminatable handbag. Three batteries are connected in series to two incandescent light bulbs permanently attached to opposed upper side walls of the bag. A switch for controlling the "on"/"off" functionality of the light bulbs is positioned outside the handbag in close proximity to one of the light bulbs. Since the bulbs run hot, any contact with heat sensitive material within the handbag will result in deterioration or melting of valuables. The hot bulbs may ignite flammable material or cause injury when contacted by the user. If articles within the handbag strike one of the light bulbs it will likely fragment the glass bulb, producing glass shards within the handbag.

U.S. Pat. No. 5,934,790 discloses a purse light system. The detachable lighting system consists of an incandescent lamp comprising a mirror reflector and transparent lens, a set of batteries, a lamp control circuit and a momentary contact switch. When the momentary contact switch is pressed and released, the control circuit turns on the light for a predetermined period of time, during which the momentary contact switch is deactivated to prevent accidental drainage of the battery. During the predetermined time period, the lamp control circuit ignores pressing of the momentary contact switch. The lighting system is attached to a purse side wall using hook and pile strips. Inasmuch as the light is remote from the objects in the purse or pocketbook, the illumination is weak. Objects shadow each other, and the visibility of objects in the purse or pocketbook is limited.

U.S. Pat. No. 6,059,423 discloses a decoratively illuminated carrying device. The carrying device carries a set of lights positioned in a decorative pattern on the outside of the carrying device so that it may be clearly seen. This carrying device, when used by a child during Halloween, improves safety and visibility of the child. It does not illuminate the bag interior. In this respect, this device is not a pocketbook lighting system.

U.S. Pat. No. 6,099,140 discloses a pocket light. An elongated body of a pocket light having a horseshoe cross section houses a pair of batteries within the horseshoe. A set of incandescent light bulbs is positioned within the horseshoe cross section below the batteries, and provides light in the downward direction. Batteries are positioned in the circular cross sectional portion of the pocket light. A pair of light bulbs are hung pointing downwards within the horse shoe cross section. The edges of the horseshoe cross-section of the elongated pocketbook light slide over the divider of a purse or pocketbook to illuminate objects within the pocketbook or purse. An on/off switch is provided at one end of the device. Due to the large distance between the lights and objects within the pocketbook or purse, the illumination provided thereto is weak.

U.S. Pat. No. 6,120,162 discloses an automated magnetic activation system for illuminating contents in a purse, knapsack or fanny pack. A pair of incandescent lights is positioned near the top of the purse, knapsack or fanny pack. The incandescent lights are powered by a battery connected through a reed switch, which is closed by a magnet. Optionally, an integrated circuit may be used to keep the incandescent lights on for a predetermined period of time after it is activated by closing the reed switch with a magnet. The integrated switch may ignore reed switch closure once it is in the timer mode, so that the battery life is preserved.

Each of the illuminating lights is placed in close proximity to the top of the purse or knapsack, limiting the extent of illumination. Exposed light bulbs operating hot increase chances that flammable material may burn or ignite. Such exposed light bulbs are readily shattered by impact from contents within the purse.

U.S. Pat. No. 6,152,572 discloses a handbag interior illumination system. An incandescent light bulb is powered by a battery and a switch. It comprises a light source disposed in the lumen of a flexible elongate tube. Instead of having a single incandescent light bulb directing light into the tube, multiple lights may be equally spaced within the flexible elongate tube. The tube may have a reflector. It is made from transparent or translucent material, and is positioned on the top edges of a purse, pocketbook or handbag to illuminate its contents. Illumination of the tube essentially distributes the light in all directions. The flexible elongate tube is disposed around the opening edges of a purse or pocketbook to illuminate its contents. Since the transparent or translucent flexible elongate tube distributes the light in all directions, only a small portion of the light is directed towards the pocketbook contents. The large distance between the flexible elongate tube and the pocketbook contents markedly increases illumination difficulties. Moreover, to be flexible, the transparent elongated tube must be constructed from a polymeric material. Yet none of the flexible transparent polymeric materials presently available can withstand the temperature of the hot bulb without serious deformation and degradation. Most high temperature polymers, such as Teflon, PTFE and the like, which can sustain the temperatures produced by the bulb, are opaque and do not meet the transparency requirement.

U.S. Pat. No. 6,340,235 discloses an adaptable electric accessory system for containers, receptacles and the like. A lighted liner with a light source and light emitting fabric is inserted into a handbag receptacle, which carries rechargeable batteries. The liner may also have a dimmer to reduce the intensity of the light. When the liner is inserted, a power cord connects the batteries to the switch and the light source. The latter may comprise incandescent lights or laser diodes, which are the preferable light source. The handbag also carries an audio alarm adapted to be actuated when a thief snatches the handbag. The sides of the liner are made from optical fibers, which distribute the light. When optical fibers transmit light, they do not glow. This is the reason why optical fibers can transmit optical signals over large distances without attenuation. When a light source comprising incandescent light or laser diode light is in close proximity with the end of a fiber, the light is only transmitted to the other free end of the fiber. No general illumination of the fiber cloth therefore takes place contrary to the teachings of the patent disclosure.

There remains a need in the art for a pocketbook light that provides illumination so that the interior contents of the pocketbook can be readily identified without subjecting the contents to high temperature of incandescent light source. Needed also are a method and means for preventing breakage of light bulbs and generation of glass shards within the pocketbook. Since the light source is best powered by a small battery adapted to fit within a pocketbook, power conservation and efficiency of generated light for illuminating contents of a pocketbook is extremely critical.

SUMMARY OF THE INVENTION

The present invention provides a pocketbook light having a lightweight, compact construction. Advantageously, the pocketbook light of our invention is inexpensive to construct and operates in an efficient, reliable manner. It provides significant illumination to a pocketbook interior without subjecting pocketbook contents to a high temperature incandescent light source. The light generating means runs cool and requires very little power. Deterioration or melting of values, and injuries caused by contact with the user, are virtually eliminated. The pocketbook light is safely disposed within the pocketbook interior in close proximity to pocketbook contents, which are strongly illuminated and readily identified.

Generally stated, the pocketbook illumination apparatus comprises a battery power source coupled with a switch adapted to activate a remotely located light source comprising an incandescent light, or single or multiple sets of light emitting diodes (LED). Light from this light source is coupled to an optical fiber light pipe, which is extended within the pocketbook in close proximity to its contents. This optical light pipe transmits light; but does not glow and is not illuminated. Light contained within the optical fiber light pipe is extracted using molded or machined grooves and scratch-like surface irregularities or hemispherical or trapezoidal projections. These light extraction mechanisms are optically coupled to the light pipe and throw out light in an omni-directional manner, illuminating contents of the pocketbook effectively without creating shadow effects. The light pipe and the light extraction device are inherently insulating and transmit light with minimal heat generation even with use of an incandescent light source. Substantial protection is thereby afforded to pocketbook contents that are heat sensitive. In an alternate embodiment, individual LED elements are located within the pocketbook in close proximity with its contents. Illumination is provided when the LED elements become energized. This is accomplished by turning "on" a switch connecting battery power to the LEDs. Shaking or tipping the pocketbook, or dumping out its contents does not damage these illuminating devices or produce broken glass shards.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Pocketbooks are typically small and generally contain a large number of small articles including heat sensitive cosmetics, such as lipstick, and combustible material such as tissue paper and the like. In darkened environments such as parking lots, hallways, alleyways and the like, one needs to examine to contents of the pocketbook to locate critical items such as car keys, etc. A low cost, reliable, pocketbook illumination system capable of illuminating content of the pocketbook without shadowing objects or producing heat induced damage provides convenience and safety to pocketbook users.

The present invention provides a pocketbook light having an optical fiber light pipe to transmit the light from a remotely located light source within the pocketbook. Preferably, the light source comprises an incandescent light source or an LED linked by the optical fiber light pipe to the interior of the pocketbook, so as to project light in close proximity with the contents of the pocketbook. The light from the optical fiber light pipe is extracted at selected locations. It provides an omni-directional light output that illuminates the contents of the pocketbook, so that objects therein are readily identified. The optical light pipe and light extraction devices located thereon are composed of thermally insulating, transparent plastics, which virtually eliminate breakage or shard formation. The transmission of light from an LED or incandescent light source using an optical fiber light pipe and extraction means does not convey high temperatures. Owing to the thermally insulating properties of optical fibers, such light transmission is readily accomplished at low temperatures. Advantageously, with use of the optical light pipe and light extraction means, damage to heat-sensitive materials inside the pocketbook, and injuries precipitated by skin contact are substantially prevented.

The pocketbook light comprises a set of batteries, a switch and a solid state light source, which is disposed within a pocketbook, purse or handbag so that the light source is in close proximity of pocketbook contents. Robust, solid-state light emitting diodes ("LEDS"), illuminate the contents of the pocketbook without shadowing pocketbook objects. Moreover, damage to the light source caused by interaction with pocketbook objects is minimized.

Alternatively, optical fiber light transmission means having an optical light extraction means is used for illumination of the pocketbook contents. The optical light extraction means are disposed within the pocketbook at selected regions, permitting light to escape from a plurality of positions within the pocketbook. Each of these illumination means is illustrated in the FIGS. 1B, 1C and 1D of the drawings.

Figure 1A:
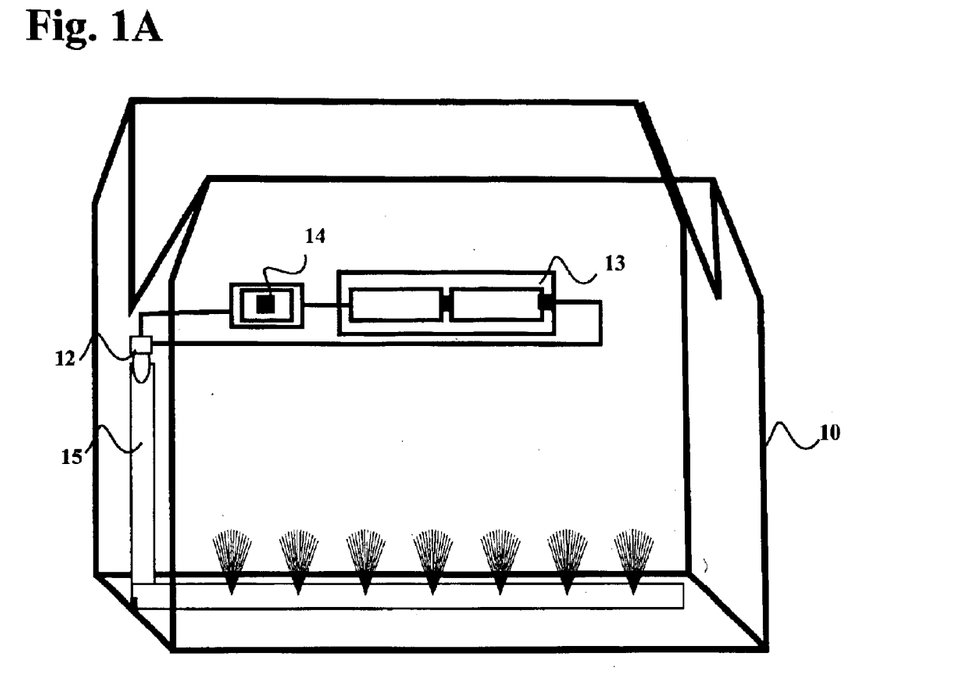
FIG. 1A schematically illustrates an apparatus for illuminating a pocketbook interior with a remotely located incandescent light bulb that is optically coupled to a light pipe and associated with a light extraction means disposed at a selected locations inside the pocketbook.
Figure 1B:
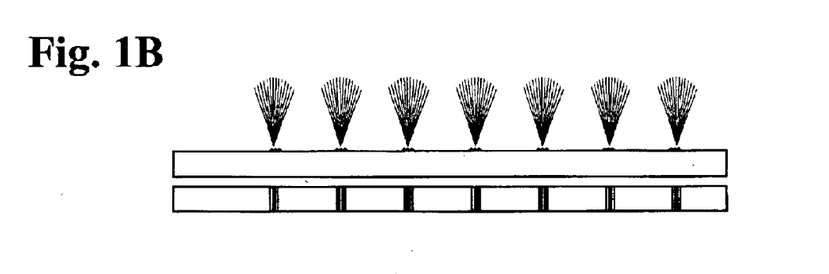
FIGS. 1B–D schematically illustrate light extraction means suitable for illuminating the interior of the pocketbook shown in FIG. 1A.
Figure 1C:
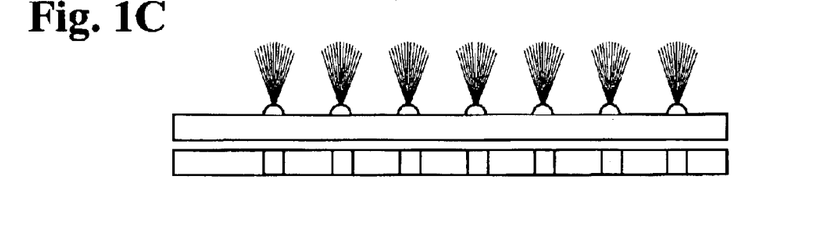
Figure 1D:
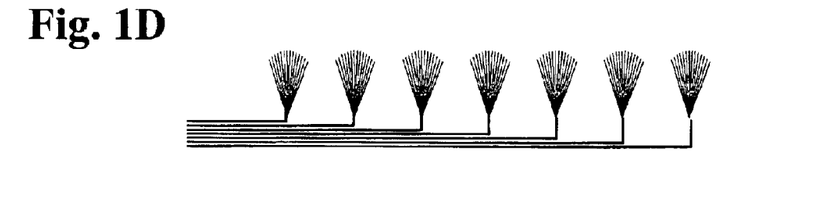
Figure 2A:
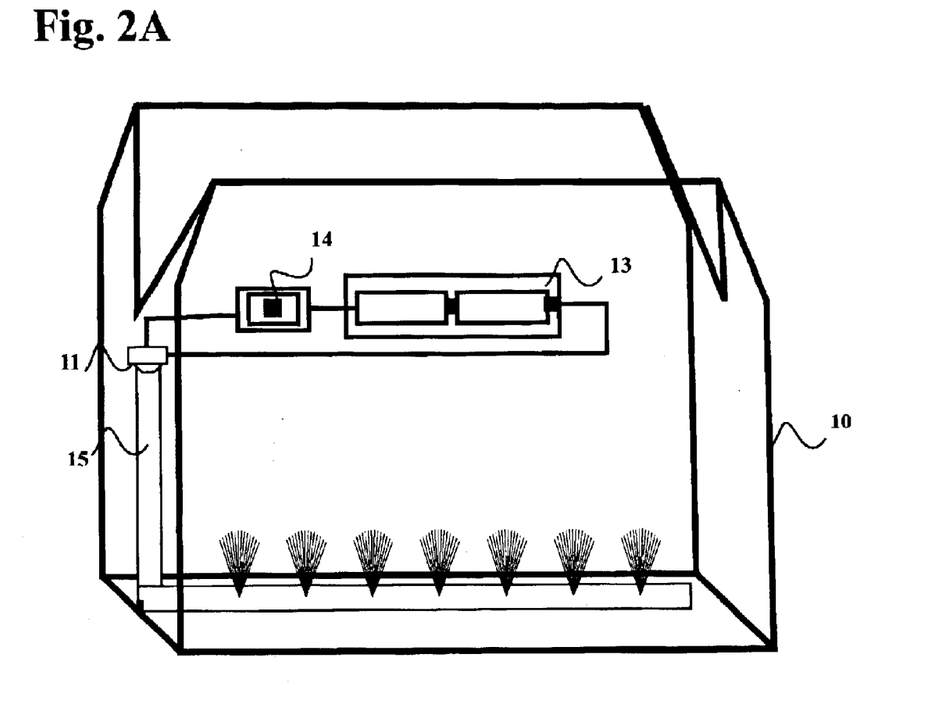
FIG. 2A is a schematic diagram illustrating an apparatus for illuminating a pocketbook interior with a remotely located light emitting diode (LED) light source that is optically coupled to a light pipe and associated with a light extraction means disposed at selected locations inside the pocketbook.
Figure 2B:
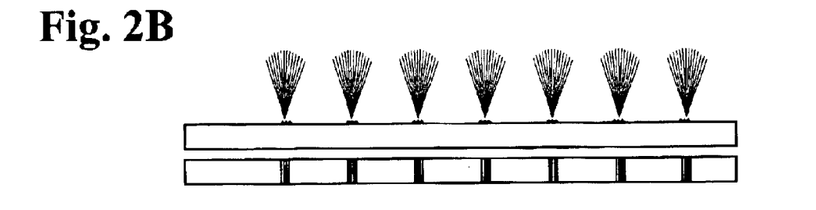
FIGS. 2B–D schematically illustrate light extraction means suitable for illuminating the interior of the pocketbook shown in FIG. 2A.
Figure 2C:
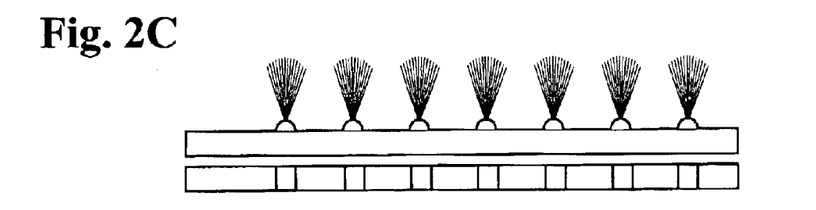
Figure 2D:
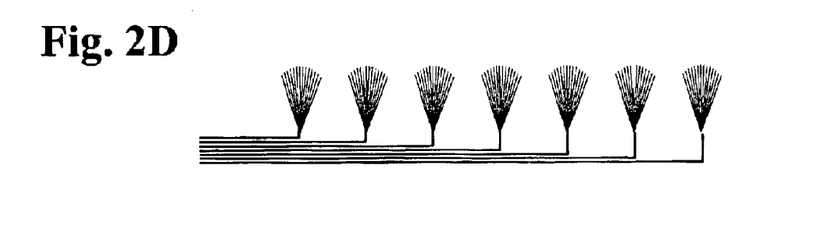

In FIG. 1A there is illustrated a pocketbook 10 having a single light bulb 12 connected to a set of batteries 13 through a switch 14. The bulb light output is connected to a transparent light transmitter 15. Generally, transmitter 15 comprises a rod made from a polymer protected glass fiber bundle, such as Plexiglas, Lexan or other materials bent in the shape of the purse. The light beam travels through the rod from the lighted end to the free end. A series of structures are molded on the rod at positions closely proximate to contents of the pocketbook. Light transmitted through the rod is allowed to escape from the structures. In one embodiment, the structures comprise a plurality of molded or machined grooves having the configuration shown in FIG. 1B (both side view and top view shown). The structures may also comprise a plurality of hemispherical projections having the configuration shown in FIG. 1C (both side view and top view shown), or projections of trapezoidal shapes (not shown). Alternatively, there may be used a fiber optic bundle having different strands terminated at different lengths that correspond to interior sections of the pocketbook appointed to receive illumination, as shown in FIG. 1D. Ends of single fibers are encased in transparent polymer to prevent fiber damage and skin injury. The lighting system may be integrated with the pocketbook; or constructed as an integrally independent unit that is readily attached and detached.

FIG. 2 illustrates a pocketbook 10 equipped with a set of batteries 13 connected to a light emitting diode 11. In a manner similar to the device of FIG. 1, the diode 11 operates to provide a light source that illuminates a transparent light transmitting device. Embodiments B through D are shown with an LED as a light source. LEDS are available in red green and blue. The human eye is most light sensitivity to green, with the result that green LEDS are generally preferred. Optionally, three colored LED lights are optically combined to produce a nearly white light, which is coupled with a transparent optical light-transmitting device.

Figure 3:
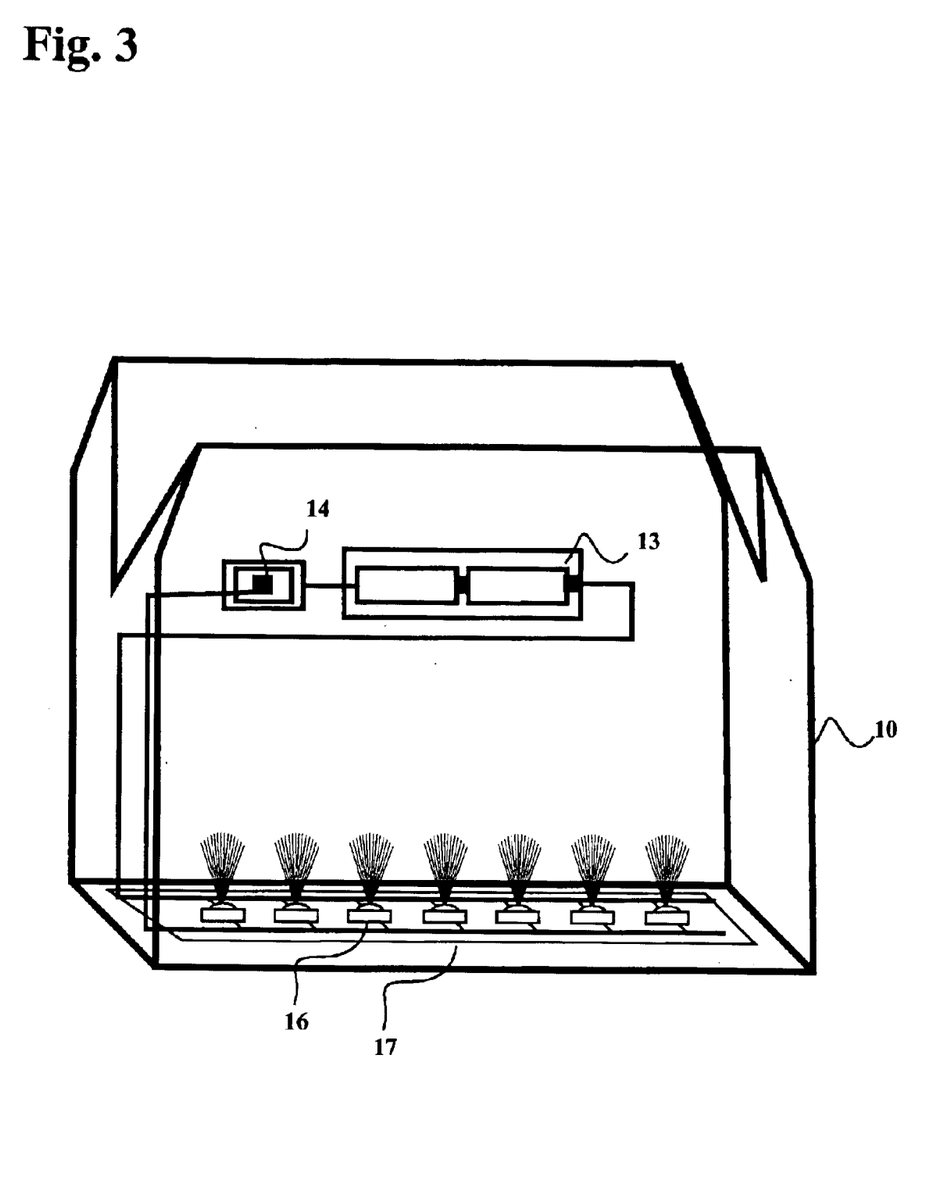
FIG. 3 is a schematic diagram illustrating an apparatus for illuminating a pocketbook with a multiple sets of light emitting diodes (LED) located at selected locations within the pocketbook and electrically connected individually to the battery power source through a switch and light source.

FIG. 3 illustrates a pocketbook 10 having a set of batteries 13 connected to a series of light emitting diodes 16 positioned within the pocketbook in close proximity with the contents. These light emitting diodes are connected in parallel, and are oriented to illuminate the interior of the pocketbook. Such LEDS are inherently robust since they are solid state devices, which are fully encapsulated. The wiring and the LEDS may be further hardened by placing them in a transparent plastic tube or sheet-pouch 17. Since these LEDS produce very little heat, they can be safely encapsulated in this manner, to protect them against damage from the pocketbook contents.

Figure 4:
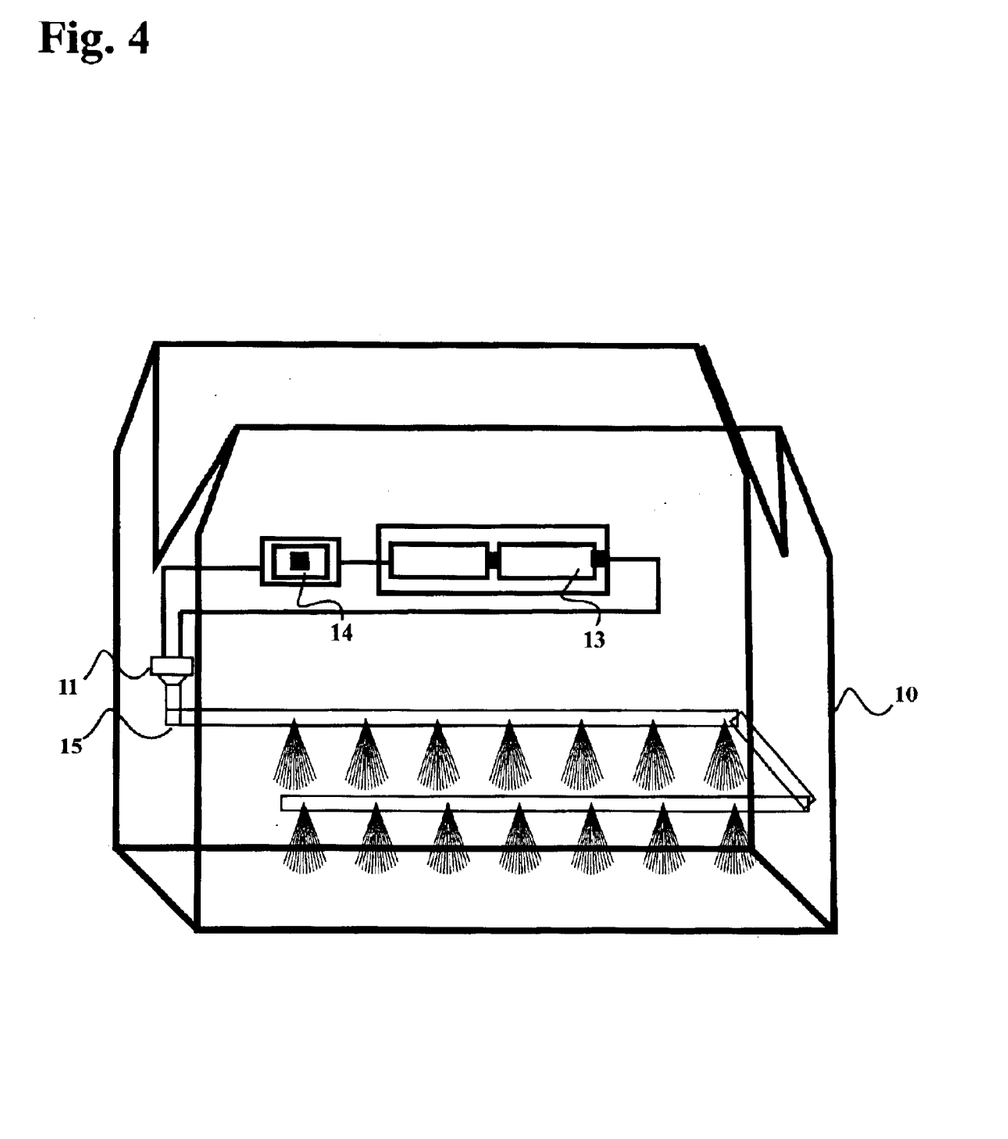
FIG. 4 is a schematic diagram illustrating an apparatus for illuminating a pocketbook with a remotely located light emitting diode (LED) or incandescent light source, optically coupled to a folded light pipe located at the near mid-plane of the pocketbook, and a light extraction means for downwards illumination.

In FIG. 4 there is shown an alternate positioning arrangement for the transparent light transmitting device 15. Instead of resting in the bottom of the pocketbook, the transparent light transmitting device 15 and LED light source 11 is attached to the pocketbook side walls in the near mid-plane of the pocketbook. A set of LEDS connected in parallel may be positioned in the same location. Further, a fiber optic cable having individual elements terminating at different locations may provide the same functionality. In all cases, the illuminating features described in FIGS. 1A–C are oriented towards the pocketbook contents; the LEDS, are oriented in a similar manner. These devices produce very little or no heat. They do not deform or damage heat sensitive objects and are not readily damaged by contents within the pocketbook, even during rough usage.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An apparatus for illuminating contents of a pocketbook comprising:

a. a light source electrically connected to a battery through a switch, each of said light source, battery and switch being disposed within said pocketbook;

b. said light source being coupled to an optically transmitting light pipe, for bringing said light into the pocketbook in close proximity with said pocketbook contents;

c. light extraction means optically coupled to the said optically transmitting light pipe for allowing the light to escape and thereby provide omni-directional illumination in close proximity with the pocketbook contents; and d. said light extraction means being comprised of molded or machined grooves.

2. An apparatus for illuminating contents of a pocketbook as recited by claim 1, wherein said light source comprises an incandescent light bulb.

3. An apparatus for illuminating contents of a pocketbook as recited by claim 1, wherein said light source comprises at least one light emitting diode.

4. An apparatus for illuminating contents of a pocketbook as recited by claim 3, wherein said light source comprises in combination at least one red, green and blue diode.

5. An apparatus for illuminating contents of a pocketbook as recited by claim 1, wherein said optically transmitting light pipe is composed of Plexiglas.

6. An apparatus for illuminating contents of a pocketbook as recited by claim 1, wherein said optically transmitting light pipe is composed of Lexan.

7. An apparatus for illuminating contents of a pocketbook as recited by claim 1, wherein said optically transmitting light pipe comprises a polymer coated glass fiber bundle.

8. An apparatus for illuminating contents of a pocketbook as recited by claim 1, wherein said optically transmitting light pipe and light extraction means are located in a near mid-plane attached to the side walls of the pocketbook for providing downward illumination to said contents.

9. An apparatus for illuminating contents of a pocketbook comprising:

a. a light source electrically connected to a battery through a switch, each of said light source, battery and switch being disposed within said pocketbook;

b. said light source being coupled to an optically transmitting light pipe, for bringing said light into the pocketbook in close proximity with said pocketbook contents;

c. light extraction means optically coupled to the said optically transmitting light pipe for allowing the light to escape and thereby provide omni-directional illumination in close proximity with the pocketbook contents; and d. said light extraction means being comprised of molded or machined hemispherical grooves.

10. An apparatus for illuminating contents of a pocketbook as recited by claim 9, wherein said light source comprises an incandescent light bulb.

11. An apparatus for illuminating contents of a pocketbook as recited by claim 9, wherein said light source comprises at least one light emitting diode.

12. An apparatus for illuminating contents of a pocketbook as recited by claim 1, wherein said light source comprises in combination at least one red, green and blue diode.

13. An apparatus for illuminating contents of a pocketbook as recited by claim 9, wherein said optically transmitting light pipe is composed of Plexiglas.

14. An apparatus for illuminating contents of a pocketbook as recited by claim 9, wherein said optically transmitting light pipe is composed of Lexan.

15. An apparatus for illuminating contents of a pocketbook as recited by claim 9, wherein said optically transmitting light pipe composes a polymer coated glass fiber bundle.

16. An apparatus for illuminating contents of a pocketbook as recited by claim 9, wherein said optically transmitting light pipe and light extraction means are located in a near mid-plane attached to the side walls of the pocketbook for providing downward illumination to said contents.

17. An apparatus for illuminating contents of a pocketbook comprising:

a. a light source electrically connected to a battery through a switch, each of said light source, battery and switch being disposed within said pocketbook;

b. said light source being coupled to an optically transmitting light pipe, for bringing said light into the pocketbook in close proximity with said pocketbook contents;

c. light extraction means optically coupled to the said optically transmitting light pipe for allowing the light to escape and thereby provide omni-directional illumination in close proximity with said pocketbook contents; and d. said light extraction means being comprised of molded or machined trapezoidal projections.

18. An apparatus for illuminating contents of a pocketbook as recited by claim 17, wherein said source comprises an incandescent light bulb.

19. An apparatus for illuminating contents of a pocketbook as recited by claim 17, wherein said light source comprises at least one light emitting diode.

20. An apparatus for illuminating contents of a pocketbook as recited by claim 19, wherein said light source comprises in combination at least one red, green and blue diode.

21. An apparatus for illuminating contents of a pocketbook as recited by claim 17, wherein said optically transmitting light pipe is composed of Plexiglas.

22. An apparatus for illuminating contents of a pocketbook as recited by claim 17, wherein said optically transmitting light pipe is composed of Lexan.

23. An apparatus for illuminating contents of a pocketbook as recited by claim 17, wherein said optically transmitting light pipe composes a polymer coated glass fiber bundle.

24. An apparatus for illuminating contents of a pocketbook as recited by claim 17, wherein said optically transmitting light pipe and light extraction means are located in a near mid-plane attached to the side walls of the pocketbook for providing downward illumination to said contents.

25. An apparatus for illuminating contents of a pocketbook comprising a. a light source electrically connected to a battery through a switch, each of said light source, battery and switch being disposed within said pocketbook;

b. said light source being coupled to an optically transmitting light pipe, for bringing said light into the pocketbook in close proximity with said pocketbook contents;

c. light extraction means optically coupled to the said optically transmitting light pipe for allowing the light to escape and thereby provide omni-directional illumination in close proximity with said pocketbook contents; and d. said optically transmitting light pipe being comprised of a fiber optical bundle and said light extraction means having a plurality of ends of single fibers enclosed in a transparent polymer for illuminating said contents at different locations within said pocketbook.

26. An apparatus for illuminating contents of a pocketbook as recited by claim 25, wherein said light source comprises an incandescent light bulb.

27. An apparatus for illuminating contents of a pocketbook as recited by claim 25, wherein said source comprises at least one light emitting diode.

28. An apparatus for illuminating contents of a pocketbook as recited by claim 27, wherein said light source comprises in combination at least one red, green and blue diode.

29. An apparatus for illuminating contents of a pocketbook as recited by claim 25, wherein said optically transmitting light pipe and light extraction means are located in a near mid-plane attached to the side walls of the pocketbook for providing downward illumination to said contents.

* * * * *